Aug. 11, 1959 R. D. REICHERT 2,899,589
MOUNT STRUCTURE FOR ELECTRON TUBES
Filed Oct. 16, 1953
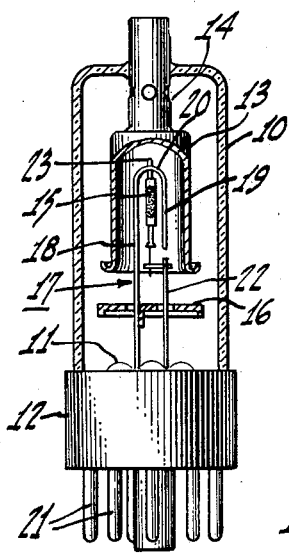
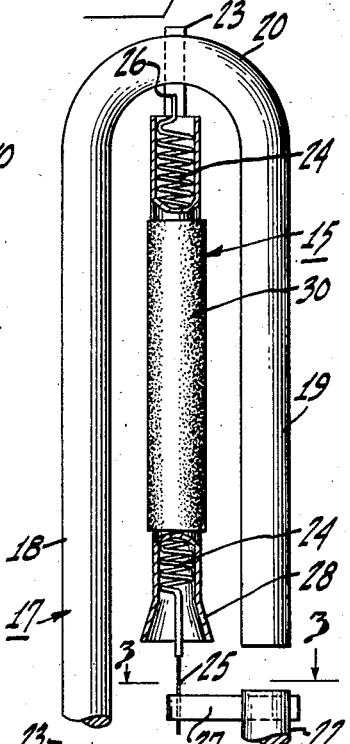
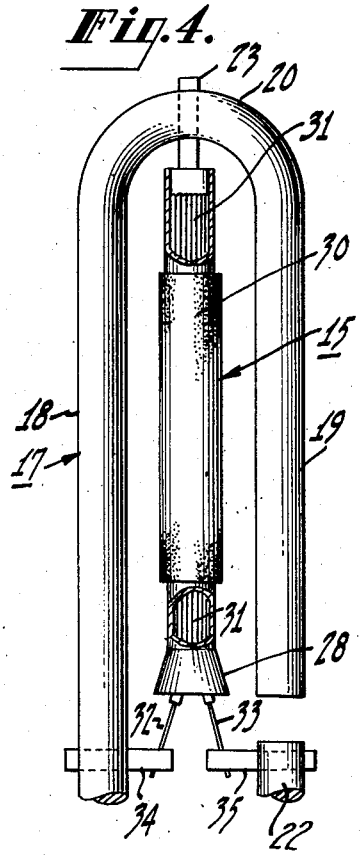
INVENTOR.
ROBERT D. REICHERT
BY William A. Zalesak
ATTORNEY

2,899,589
MOUNT STRUCTURE FOR ELECTRON TUBES

Robert D. Reichert, Irvington, N.J., assignor to Radio Corporation of America, a corporation of Delaware Application October 16, 1953, Serial No. 386,440

9 Claims. (Cl. 313—243)

The invention relates to electron tube mounts, and particularly to support structures for cathodes included in such mounts.

It is a primary object of the invention to provide an improved support for a cathode.

A further purpose is to provide a support for an indirectly heated cathode characterized by reduced heat drain from the cathode.

Another aim of the invention is to provide a support for a cathode in a high voltage electron tube that provides balanced shielding of the cathode from an associated electrode of high potential difference from the cathode.

A further object is to provide a cathode support having balanced shielding elements at the same potential for effectively balancing electrical forces acting on the cathode without objectionable emission drain from the cathode.

Another purpose is to provide a rugged support for an indirectly heated cathode in a high voltage electron tube.

A feature of the invention resides in the provision of a support for a cathode in the form of a U-shaped rod having one leg longer than the other, the longer leg being sealed through one end of the envelope of an electron tube. The transverse portion of the U-shaped rod provides support for one end of the cathode. The two legs have portions extending coextensively with the cathode and spaced from opposite sides of the cathode. Since these leg portions are integral, they are at a common potential. This provides balanced shielding of the cathode.

According to another feature of the invention, another and rectilinear rod is provided extending through the end of the envelope referred to and in coaxial and end spaced relation to the shorter of the two legs of the U-shaped rod. This not only supplements the balanced shielding referred to, but also provides a terminal for the other end of the cathode. Where an indirectly heated cathode is involved, the rectilinear rod aforementioned provides a terminal for one end of a heater energizing the cathode. The other end of the heater may either be connected to the aforementioned transverse portion of the U-shaped rod, or to a connector extending from a suitable portion of the U-shaped rod. Where the heater is snugly received in the cathode, the connection of the heater to the rectilinear rod provides support for one end of the cathode with reduced heat drain from the cathode.

Another feature of the invention concerns the provision of means for ruggedizing the support for an indirectly heated cathode in a high voltage electron tube. According to this feature, a metal band is fixed transversely of the cathode sleeve and the two legs of the U-shaped rod aforementioned, and adjacent the free end of the shorter leg and the end of the cathode remote from the transverse portion of the rod. This provides rugged support for the cathode and in addition serves to restrain vibration of the shorter leg of the U-shaped rod.

Where one end of the cathode sleeve is supported by the heater, further features of the invention provide for a flare at this end of the sleeve to prevent a chipping of the insulation on the heater by the sleeve end, and a rugged weld connection between the heater and a support.

Further objects and features of the invention will become apparent as the present description proceeds.

Referring now to the drawing for a more detailed consideration of several embodiments of the invention, Figure 1 is an elevational view partly in section showing an electron tube incorporating the invention;

Figure 2 is an enlarged view in elevation and partly in section of the cathode support structure shown in Figure 1;

Figure 3 is a transverse sectional view taken along the line 3—3 of Figure 2;

Figure 4 is a view in elevation, partly in section, of a modified form of cathode support;

Figure 5 is an elevational view partly in section of a further modification of the cathode support of the invention.

The novel cathode support of the invention is shown in Figure 1 in association with a high voltage electron tube having a use related to that of a tube known commercially as the 1B3GT. The tube includes a glass envelope 10 closed at one end by a reentrant stem 11 and having at said end a base 12. Within the envelope 10 are disposed an anode 13 closed at one end and supported by tubular lead 14 fixed to said closed end and sealed through the end of envelope 10 remote from stem 11. The other end of the anode is open for receiving a cathode 15 which in this embodiment is of the indirectly heated type and a cathode support structure. A shield 16 serves to shield the stem from electron bombardment.

One form of cathode support structure according to the invention is shown in Figures 1 and 2. This form includes a U-shaped metal rod 17 having legs 18 and 19, and a transverse portion 20. Leg 18 is longer than leg 19, and is sealed through stem 11 and electrically engages one of the prongs 21 of the tube. The support structure also includes a rectilinear metal rod 22 also sealed through the stem 11 and electrically engaging another of the prongs 21. The U-shaped rod 17 extends from stem 11 towards the end of the envelope remote from the stem to a position wherein the U-shaped portion of the rod is disposed within anode 13 so that the free end of the shorter leg 19 is substantially in the plane of the open end of the anode.

This support structure advantageously supports cathode 15, at both ends of the cathode. At one end of the cathode the support may be accomplished by a tab 23, shown best in Figure 2, welded to one end portion of the cathode 15 and to the transverse portion 20 of the U-shaped support rod 17. At the other end of the cathode, support may be effected through insulatingly coated heater 24 which may be in the form of a coil snugly engaging the inner wall of the cathode 15. This heater may have two uncoated end portions 25, 26. The uncoated end portion 25 may be fixed as by welding to rectilinear support rod 22 by means of a metal tab 27. The other uncoated end portion 26 may be fixed as by welding to the tab 23. The end portion 28 of cathode sleeve 15 adjacent the end portion 25 of the heater may be flared outwardly to prevent a chipping of the insulating coating on the heater adjacent said cathode end portion.

Since the burden of supporting the flared end 28 of the cathode is placed on the heater 24, it is necessary that the bond between the heater end portion 25 and the tab 27 be rugged in character. Tab 27 is usually made of nickel and has a substantial cross-section in relation to that of heater end portion 25. The heater may comprise a tungsten wire 2 mils in diameter. In welding, the heater to the tab 27, an appreciable heat input to the weld region is necessary because of the high heat conductivity of the relatively massive tab 27. While this appreciable heat is not harmful to the tab aforementioned because of its high heat conductivity, it may be sufficient to burn and fracture the heater end portion 25 which conducts heat poorly because of its relatively small cross-section.

To provide a rugged bond between the heater end portion 25 and the tab 27, the tab is bent at its free end portion to provide a V-shaped recess 29 as shown in Figure 3. In welding the heater end portion 25 to the tab, the end portion referred to is extended laterally into the recess 29. Welding electrodes of an electrical welding system, not shown, may engage opposite outer surfaces of the V-shaped structure. This softens the material of the tab 27 at the T-shaped structure and in the vicinity of the engagement between said structure and the heater portion 25 and urges the softened material around this heater portion. This provides a good weld between the heater and tab 27. The heater portion 25 is out of direct contact with a welding electrode and is therefore not heated to a degree causing rupture. The V-shaped structure is also free from damaging heat as a consequence of the appreciable heat conductivity of its relatively larger cross-section. This bond is well capable of providing a strong link in the chain of support including heater 24, heater end portion 25, tab 27 and rectilinear support rod 22, for supporting the end 28 of the cathode 15.

To facilitate welding the tab 23 to the cathode, and to permit flaring the cathode, as at 28, the two end portions of the cathode should be free of the electron emitting coating 30.

To dispose the cathode 15 for maximum symmetrical shielding between the legs 18, 19 of the U-shaped support rod, it is preferable to fix the tab 23 to adjacent sides of the tranverse portion 20 and the cathode 15. In some applications, the diameter of the legs 18, 19 is greater or substantially equal to the diameter of cathode 15, so that engagement by tab 23 of adjacent sides of transverse portion 20 and the cathode sleeve contributes to a positioning of the cathode fully within the shadow of the legs 18, 19. Further contribution to this effect is supplied by the tab 27 which may be bent to orient the end 28 of the cathode in the shadow of legs 18, 19.

It will be apparent from the foregoing that an advantageous support for an indirectly heated cathode in a high voltage electron tube is provided. The legs 18, 19 of the U-shaped support are disposed on opposite sides of the cathode 15 and therefore provide a balanced shielding of the cathode from the anode 13. The balanced character of this shielding is further enhanced by the integral structure of the legs 18, 19, as a result of which they are electrically equipotential. This characteristic of the legs referred to, additionally is advantageous in that undesired drain of cathode emission is avoided. In this connection, it will be noted that the cathode is always at the potential of the legs 18, 19, as a consequence of the direct tab connection between this cathode and the transverse portion 20, integral with the legs aforementioned.

In addition to balanced shielding of the cathode and avoidance of undesired emission drain, the support structure is free from the objection of conducting heat away from the cathode. Thus, the only connections between the cathode 15 and the support structure is effected through a single tab 23 of relatively small cross-section and end portion 25 of the relatively small diameter heater. The tab 23 may be made of a low heat conducting metal such as Kovar. While the tab 23 has a larger cross-section than the heater end portion 25, the tab is arranged to engage the hottest portion of the U-shaped rod 17. This is the transverse portion 20 extending farthest into the anode 13 and shielded by the anode against heat dissipation by radiation. The support structure shown in Figures 1 and 2 is further advantageous in that the physical connections between the cathode assembly including cathode 15 and heater 24, and the support structure are reduced in number to the minimum required for electrical energization of the heater and cathode. It would not be feasible to operate the cathode assembly with less than the two electrical connections shown.

It will be obvious that the support structure described is also suitable for supporting a directly heated or filament type cathode. Thus, if the cathode 15 is removed and the filament 24 is coated with emitting material, to constitute a cathode, it will be seen that in the construction described, the upper end of the filament is supported by tab 23 and the lower end by tab 27, as viewed in Figure 2.

It is therefore to be appreciated that the cathode support of the invention provides a structure for maximum reduction in heat dissipation from the cathode, and for good support of the cathode. Where indirectly heated cathodes are involved, the single coil construction of the heater permits of electrical connection to the heater at opposite ends of the cathode for reducing the number of electrical connections to the cathode assembly to the aforementioned minimum. It also provides a heating structure that is well suited for snugly engaging the inner walls of the cathode sleeve with appreciable force, for providing good support of the sleeve through the heater. Furthermore, the single coil construction of the heater 24, permits disposition of the end portion 25 of the heater in coaxial relation with respect to the cathode 15, thereby, in conjunction with the outward flare in end portion 28 of the sleeve, providing desired isolation of this uncoated end portion from the adjacent end of the cathode sleeve.

In the embodiment shown in Figure 4, the heater is in the form of a folded structure 31. The folded structure may comprise an elongated insulatingly coated wire of tungsten folded back upon itself a plurality of turns to provide a plurality of folds. The cathode 15 enclosing the heater is similar to the cathode 15 shown in Figures 1 and 2, and includes a flared portion 28 at one end thereof. The heater 31 has two bare end portions or legs 32, 33.

The support structure for the cathode-heater assembly described, includes the U-shaped rod 17 having legs 18, 19 and transverse portion 20, tab 23 and rectilinear rod 22, all similar to comparable elements of Figures 1 and 2. As in the case of the structure of Figures 1 and 2, the tab 23 is welded to the outer side of the end portion of the cathode remote from the flare 28 and to the adjacent side of transverse portion 20, for supporting one end of the cathode and disposing the cathode in the shadow of legs 18, 19. However, the structure of Figure 4, departs from that of Figures 1 and 2, in that the two ends 32, 33 of the heater 31 extend from the same end of the cathode and are fixed to independent tabs 34, 35 which are in turn fixed to legs 18 and 22. The tabs 34, 35 may be made of Kovar. The bare portions 32, 33 of the heater may be welded to the tabs in the manner described above and shown in Figure 3.

This cathode mount construction, however, is not as satisfactory as that shown in Figures 1 and 2. This is because the mount includes three connections between the cathode-heater assembly and the support structure, instead of two as in Figures 1 and 2. The larger number of connections result in an added avenue for heat dissipation by conduction. Moreover, the folded character of the heater 31 necessarily disposes the legs 32, 33 thereof, which have coated portions, adjacent the edge defining the open end of the cathode sleeve, thereby creating hazards of peeling of the heater coating with consequent shorts between the heater and cathode. The fact that the flared wall of the cathode is supported solely through the heater legs and the heater legs are required to absorb displacements of the cathode caused by impacts, not only increases the peeling hazard, but in addition may rupture one or both of the legs as a result of a shearing action by the adjacent end edge of the cathode sleeve. However, in some applications, these disadvantages may be more than balanced by the advantage of a folded heater in affording a more compact structure of greater heater wire length than is practical in connection with a coiled heater.

A further embodiment of the invention is shown in Figure 5. The structure of this embodiment includes that of Figure 4 and in addition, a tab 36, welded to adjacent side of legs 18, 19 and cathode 15. The weld to the cathode is preferably adjacent the narrower end of the flared portion 28 to effect a minimum displacement of the cathode out of the plane of the legs 18, 19. The tab 36 is preferably disposed at the same side of the cathode and the legs 18, 19, as the tab 23, to assure a parallel disposition of the cathode with respect to the legs 18, 19 and the anode 13. The tab 36 serves to supplement the support of the flared end of the cathode afforded by the heater legs aforementioned in connection with Figure 4, to provide a more rugged support for this end.

While the use of the tab 36 is particularly advantageous in connection with a mount structure shown in Figure 4, because of the aforementioned peeling and rupture hazards of such support, it may also be used in connection with the cathode support structure shown in Figures 1 and 2. The addition of the tab 36 to either of the supports mentioned ruggedizes the entire support structure, and also restrains the free end portion of leg 19 against vibration resulting from tube impacts. Such vibration restraint assures a constant balance in the shielding of the cathode from the anode. The tab 36 may be used where heat losses from the cathode are not as critical as in the case of the structures shown in Figures 1, 2 and 4, and where ruggedness of the cathode support is of paramount consideration.

It will be apparent from the foregoing that a novel cathode mount is provided that is particularly suited for use in high voltage electron tubes. The cathode support structure of the mount is impervious to high voltage conditions and preserves the cathode from harm under such conditions. Its structural characteristics providing these advantages also contribute to reduced heat losses from the cathode. The structure of the invention renders it feasible to employ an indirectly heated cathode in a high voltage electron tube, with advantages in emission current that such cathode provides.

What is claimed is:

1. A high voltage electron tube comprising an elongated envelope, a tubular anode coaxial with and within said envelope, a sleeve type cathode coaxial with and within said anode, an insulated heater wire only, within said cathode, and a support for said cathode, said support comprising two spaced metal rods extending through one end of said envelope, one of said rods having a portion extending into said anode, a first fixing means engaging a first side of said cathode adjacent to one end thereof and a second side of said rod portion for fixing said cathode end to said rod portion, the other of said rods extending substantially to the plane of the other end of said cathode, said heater snugly engaging the inner wall of said cathode and having a portion extending out of said other end of said cathode, and a second fixing means engaging a third side of said other of said rods and said heater portion and fixing said other end of the cathode with respect to said other of said rods, said first, second and third sides facing a common direction, said rod portion extending between said anode and opposite sides of said cathode for balanced shielding of said cathode from said anode.

2. A high voltage electron tube comprising an elongated envelope, a tubular anode supported coaxially in said envelope and defining a first space, integral electrically conductive support means defining opposite sides of an elongated space within and coaxial with said anode, a cathode substantially entirely within said space, and fixing means outside of said elongated space and within said first space and engaging adjacent sides of said support means and said cathode, whereby said cathode is equally shielded from said anode at opposite sides thereof.

3. A high voltage electron tube comprising an elongated envelope, a tubular anode supported in said envelope, an integral metal support defining opposite sides of an elongated space entirely within and coaxial with said anode, a tubular cathode substantially entirely within said space, a fixing member outside of said elongated space defined by said support and engaging sides of said support and cathode disposed in the same plane, a heater snugly within said cathode and having an end extending from one end of said cathode, and additional support means spaced from said anode and engaging said heater end, whereby said cathode is supported for balanced shielding from said anode.

4. A high voltage electron tube according to claim 2, and wherein said cathode is tubular and supported by a structure comprising, a heater within said cathode, and two supports for the ends of said cathode, one of said supports comprising a first rod fixed to one end of said cathode and providing the sole support for said one end, said heater having a portion extending outwardly beyond the other end of said cathode, said heater snugly engaging the inner walls of the cathode adjacent said other end thereof, the other of said supports comprising a second rod fixed to said heater portion, said heater portion comprising the sole support for said other end of the cathode.

5. A high voltage electron tube according to claim 3 and wherein said additional support means comprises a rod fixed to one end of said envelope and to said heater end only, and constituting the sole support for said one end of the cathode.

6. A cathode mount comprising a sleeve type cathode, a U-shaped rod having legs parallel to and substantially equidistantly spaced from opposite sides of said cathode, one end of the cathode being fixed to the transverse portion of said U-shaped rod, one of said legs extending substantially to the plane of the other end of said cathode, a stem axially spaced from said cathode, the other of said legs being fixed to and extending through said stem, a rectilinear rod fixed to and extending through said stem to a plane intermediate said stem and said other end of the cathode and in alignment with said one of said legs, a heater within said cathode and having two legs extending outwardly from said other end of the cathode, a first tab connecting one of said heater legs to said one of the legs of the U-shaped rod, and a second tab connecting the other heater leg to said rectilinear rod, said heater snugly engaging the inner wall of said cathode adjacent said other end thereof, whereby said other end of said cathode is supported by said rectilinear rod and said other of said legs of the U-shaped rod through said heater, said heater legs and said first and second tabs, and said cathode mount is adapted for use in a high voltage electron tube with reduced harm to the cathode.

7. A ruggedized cathode mount comprising a sleeve type cathode, a U-shaped rod having legs spaced from and extending parallel to opposite sides of said cathode, means fixing one end of the cathode to the transverse portion of said U-shaped rod, one of said legs having a free end substantially in the plane of the other end of said cathode, a stem axially spaced from said other end of the cathode, the other of said legs extending to and being sealed through said stem, and a member extending transversely of said cathode and said legs and being fixed to said cathode adjacent said other end thereof, to said one of said legs adjacent said free end thereof, and to an intermediate portion of said other of said legs, said fixing means and said member engaging the same sides of said sleeve and U-shaped rod and disposing said cathode and said legs in axially coplanar relation, whereby said mount is adapted for advantageous use in a high voltage electron tube with reduced harm to said cathode.

8. A high voltage electron tube comprising a cathode, an anode operable at a relatively high voltage with respect to said cathode and disposed about said cathode, said anode having an open end, a support structure for said cathode comprising a U-shaped rod having two spaced legs of unequal length and a transverse portion, said U-shaped rod extending into said open end with said transverse portion within said anode and adjacent to the other end of said anode, said legs being parallel to the axis of said anode and substantially equally spaced from the inner walls of said anode, a fixed portion of said tube spaced from said anode, the longer of said legs having an end fixed to said fixed portion, the shorter of said legs extending substantially to said open end and having a free end, fixing means engaging a side of said transverse portion in a plane tangent to adjacent sides of said legs and at a region substantially equidistant from said legs, said cathode being disposed between and parallel to said legs and having a side engaging said fixing means, whereby electrical forces acting on said cathode are balanced.

9. A high voltage electron tube comprising an elongated envelope having a stem closing one end thereof, a tubular anode supported by the other end of said envelope and having an open end facing said stem, an integral metal support comprising a rod having one end only fixed to said stem, said rod including a portion extending through said open end and into said anode and defining an elongated space within and coaxial with said anode, a tubular cathode, means fixing one end of said cathode to said rod and disposing said cathode end substantially entirely within said space and coaxial with said anode, a heater only, snugly within said cathode and having an end extending from the other end of said cathode, and another rod fixed to said stem and extending substantially to said open end, said heater end being fixed to said another rod and disposing the other end of said cathode within said space, whereby said cathode is supported for balanced shielding within said anode.

References Cited in the file of this patent

UNITED STATES PATENTS

| | | |
|---|---|---|
| 1,287,265 | Dushman | Dec. 10, 1918 |
| 1,368,584 | Torrisi | Feb. 15, 1921 |
| 1,869,567 | Krahl | Aug. 2, 1932 |
| 1,872,010 | Robinson | Aug. 16, 1932 |
| 1,999,465 | Lambert et al. | Apr. 30, 1935 |
| 2,158,665 | O'Neill | May 16, 1939 |
| 2,445,257 | Atlee | July 13, 1948 |